(12) United States Patent
Inagaki et al.

(10) Patent No.: US 7,638,203 B2
(45) Date of Patent: Dec. 29, 2009

(54) HEAT SHRINKABLE FILM

(75) Inventors: Kyoko Inagaki, Inuyama (JP); Satoshi Hayakawa, Inuyama (JP); Norimi Tabota, Inuyama (JP); Naonobu Oda, Inuyama (JP)

(73) Assignee: Toyo Boseki Kabushiki Kaisha, Osaka-Shi (JP)

( * ) Notice: Subject to any disclaimer, the term of this patent is extended or adjusted under 35 U.S.C. 154(b) by 422 days.

(21) Appl. No.: 10/581,902

(22) PCT Filed: Dec. 10, 2004

(86) PCT No.: PCT/JP2004/018457

§ 371 (c)(1),
(2), (4) Date: Jun. 7, 2006

(87) PCT Pub. No.: WO2005/056292

PCT Pub. Date: Jun. 23, 2005

(65) Prior Publication Data

US 2007/0071967 A1  Mar. 29, 2007

(30) Foreign Application Priority Data

| Dec. 12, 2003 | (JP) | ............................. 2003-414518 |
| Dec. 24, 2003 | (JP) | ............................. 2003-427537 |
| Mar. 10, 2004 | (JP) | ............................. 2004-066635 |

(51) Int. Cl.
B32B 27/08 (2006.01)
B32B 27/18 (2006.01)
B32B 27/20 (2006.01)
B32B 27/36 (2006.01)

(52) U.S. Cl. ...................... 428/480; 428/34.9; 428/327; 528/272; 524/261

(58) Field of Classification Search .................. None
See application file for complete search history.

(56) References Cited

U.S. PATENT DOCUMENTS

| 4,190,168 | A | * | 2/1980 | Jacques ..................... 215/12.2 |
| 4,233,352 | A | * | 11/1980 | Ono et al. ................... 428/141 |
| 4,963,418 | A | * | 10/1990 | Isaka et al. ................. 428/34.9 |
| 5,175,206 | A | * | 12/1992 | Kato et al. ..................... 525/29 |
| 6,513,656 | B2 | * | 2/2003 | Hanaoka et al. ............. 206/497 |
| 6,576,717 | B1 | * | 6/2003 | Kuo ........................... 525/445 |
| 6,818,312 | B2 | * | 11/2004 | Lee et al. .................... 428/447 |
| 2006/0063008 | A1 | * | 3/2006 | Inagaki et al. ............ 428/423.1 |

FOREIGN PATENT DOCUMENTS

| JP | 06-270250 A | | 9/1994 |
| JP | 2002-072890 A | | 3/2002 |
| JP | 2002-091316 A | | 3/2002 |
| JP | 2002-108217 | * | 4/2002 |
| JP | 2002-108217 A | | 4/2002 |
| JP | 2002-166509 A | | 6/2002 |
| JP | 2002-196677 | * | 7/2002 |
| JP | 2002-196677 A | | 7/2002 |
| JP | 2002-226670 | * | 8/2002 |
| JP | 2002-226670 A | | 8/2002 |
| JP | 2003-041090 A | | 2/2003 |
| JP | 2003-062903 A | | 3/2003 |
| JP | 2003-062904 A | | 3/2003 |
| JP | 2003-073486 A | | 3/2003 |
| JP | 2003-094575 A | | 4/2003 |
| JP | 4201974 B2 | | 12/2008 |
| KR | 2002-0008899 A | | 2/2002 |
| WO | WO 02/072677 A | | 9/2002 |

* cited by examiner

*Primary Examiner*—Vivian Chen
(74) *Attorney, Agent, or Firm*—Kenyon & Kenyon LLP

(57) ABSTRACT

To provide a heat shrinkable film that, when used as a label of beverage container, enhances the smoothness of external surface side to thereby prevent merchandise jamming in an automatic vending machine of beverage and that is fully satisfactory in solvent bonding capability and excels in processability. There is provided a heat shrinkable polyester film characterized in that (A) at least one major surface thereof is overlaid with 0.002 to 0.5 g/m², in terms of solid content coating amount of a silicone containing easily slipping layer, (B) a friction coefficient between one and the same easily-slipping layer satisfies a relationship of $\mu d \leq 0.27$, and that (C) the heat shrinkable polyester film exhibits a heat shrinkage percentage of not less than 50% in a maximum shrinkage direction, after immersion in hot water at 95° C. for 10 seconds. Thus, there is provided the heat shrinkable film that when used as a label of beverage container, enhances the smoothness of external surface side to thereby prevent merchandise jamming in an automatic vending machine of beverage and that is fully satisfactory in solvent bonding capability and excels in processability.

5 Claims, No Drawings

HEAT SHRINKABLE FILM

This is a 371 national phase application of PCT/JP2004/018457 filed 10 Dec. 2004, claiming priority to Japanese Patent Applications No. JP 2003-414518 filed 12 Dec. 2003, No. JP 2003-427537 filed 24 Dec. 2003, and No. JP 2004-066635 filed 10 Mar. 2004, respectively, the contents of which are incorporated herein by reference.

TECHNICAL FIELD

The present invention relates to a heat shrinkable film. In particular, the present invention aims at providing a heat shrinkable polyester film and a heat shrinkable polystyrene film for enabling prevention of jamming of commodities in beverage vending machines, in use as a label of containers for beverages, by improving slipping property of a side that forms an external surface of containers for beverages, and for exhibiting outstanding processing suitability.

BACKGROUND ART

Recently, heat-shrinkable plastic films have widely been used aiming at wrapping of packaged articles for improvement in appearance, at packaging for avoiding direct impact of contents, and at label package serving as protection of glass bottles or plastic bottles and display of articles. In plastic materials used for these purposes, are drawn films, such as polyvinyl chloride films, polystyrene films, and the films are used for labels, cap seals, or integrated packaging, for various containers, such as polyethyleneterephthalate (PET) containers, polyethylene containers, and glassware.

However, on one hand, polyvinyl chloride films have outstanding shrink characteristics, but have low heat-resisting property. Furthermore, it has problems of generation of hydrogen chloride gas or dioxins in incineration. In addition, use as shrink labels of heat-shrinkable vinyl chloride resin films for, such as PET containers, causes a problem of needing separation of the labels from the containers, in recycling use of the containers.

On the other hand, polystyrene films enable separation based on specific gravities difference between the films and PET bottle containers, and they also has outstanding quality after shrink-finishing (for example, patent document 1). In addition, polyester films have outstanding solvent resistance, do not generate black smoke or off-flavor in incineration, and, as a result, they may exhibit outstanding properties with respect to environmental problems. However, in selling with vending machines of final products, with use of these films as labels for PET bottles, unsatisfactory slipping property of a label surface may induce jamming when supplying of final products to the vending machine, or discharging of the final products therefrom. There have occurred problems that especially the final products may not be passed through a passage for the products, and may not be conveyed to an exit, inducing multiple discharges of the products. There exists necessity for improvement of these problems.

Patent document 1: Japanese Patent Laid-Open No. 2002-108217

In actual use of the heat shrinkable films in covering of containers, printing is performed thereonto, if needed, and, subsequently they are processed into shapes of labels (cylindrical labels), inner tubes, bags, etc. And after wrapping with the processed film of containers, the containers, on conveyor belts etc., pass through tunnels such as a steam tunnel (a shrinking tunnel system wherein heated steam is blown in for heat shrinking), or a hot air tunnel (a shrinking tunnel system wherein heated air is blown in for heat shrinking) to shrink the processed film and to tightly attach on the containers.

Steam tunnels can exhibit more excellent efficiency of heat transfer as compared with hot air tunnels, and can give more uniform heat shrinkage, and therefore may easily provide more excellent appearance after shrink-finishing as compared with hot air tunnels. However, in case of addition of wax components in order to provide, for example, slipping property with a resin constituting the film, there may occur such a problem that the wax components in the film surface may be removed by steam blown for heat shrinking within the steam tunnel to deteriorate the slipping property of the shrinking label.

In addition, for improving slipping property there has been adopted a method of applying a layer having excellent slipping property on a film surface. (For example, patent document 2) However, the method is performed by post processing of the film, has a problem in processing costs, and it wears by friction between rolls and laminated layers outside in processing, resulting in problems of decrease in productivity. In addition, application of easily-slipping coating for giving slipping property to a film surface before printing or after printing may deteriorate solvent adhesion property, and thereby deterioration of solvent adhesion property may sometimes cause exfoliation of an adhered area in heat shrink process, disabling solvent adhesion in an extreme case.

Patent document 2: Japanese Patent Laid-Open No. 2002-196677

DISCLOSURE OF THE INVENTION

Problem to be Solved by the Invention

The present invention is completed in the light of the above-described circumstances. The present invention aims at providing a heat shrinkable film having outstanding processing suitability, excellent transparency, and satisfactory solvent adhesion property, and thereby the film prevents jamming of articles in beverage vending machines by improving slipping property of a side as an external surface in case of use as a label of containers for beverages. The present invention aims, more specifically, at providing a heat shrinkable polyester film and heat shrinkable polystyrene film.

Means for Solving the Problem

A heat shrinkable polyester film having excellent slipping property as a first aspect of the present invention that can solve the above-mentioned problems is a heat shrinkable polyester film that satisfies following items (A) to (C):

(A) an easily-slipping layer having an amount of coating of 0.002 to 0.5 g/m$^2$ in terms of solid content containing a silicone component is formed on at least one surface of the polyester film;

(B) a friction coefficient between the easily-slipping layers satisfies a relationship of $\mu d \leq 0.27$; and (C) the heat shrinkable polyester film exhibits a heat shrinkage percentage in a maximum shrinkage direction after immersion in hot water at 95° C. for 10 seconds is not less than 50%.

A film satisfying the above-described items can prevent jamming in vending machines in the case of use as a label of beverage containers, and can provide a heat shrinkable polyester film having excellent transparency and processability.

In this case, the friction coefficient of the easily-slipping layers preferably satisfies a relationship of $\mu d \leq 0.24$. In this case, a percentage of silicone components in a solid content of the easily-slipping layer preferably is 10 to 80% by weight, and a silicone component content preferably is 0.001 to 0.4 g/m². Also in this case, the easily-slipping layer preferably includes a polyester resin component having a styrene moiety in molecule thereof. Furthermore, one surface of the film may preferably be adhered to another surface of the film with organic solvents.

A heat shrinkable polystyrene film having excellent slipping property, as a second aspect of the present invention, that can solve the above-mentioned problems is a heat shrinkable polystyrene film that satisfies following items (a) to (c):

(a) a friction coefficient at least between one and the same surface of the film satisfies a relationship of $\mu d \leq 0.25$;

(b) a friction coefficient at least between one and the same surface of a film satisfies a relationship of $\mu d \leq 0.28$, the film being immersed in hot water at 80° C. for 20 seconds, allowing shrink by 10% in a main shrinkage direction, subsequently the film being air-dried for 24 hours in an atmosphere of 65% of relative humidity at 23° C.; and (c) a heat shrinkage percentage in a maximum shrinkage direction is not less than 50%, after immersion in hot water at 95° C. for 10 seconds.

When the ranges are satisfied, the film has outstanding heat shrink properties, and furthermore may exhibit excellent slipping property, for example, after the film is made wrap a bottle container in a state of a label, and shrink in a steam tunnel.

In this case, the film preferably satisfies following items (d) and (e):

(d) a friction coefficient at least between one and the same surface of the film satisfies a relationship of $\mu d \leq 0.20$;

(e) a friction coefficient at least between one and the same surface of a film satisfies a relationship of $\mu d \leq 0.23$, the film being immersed in hot water at 80° C. for 20 seconds, allowing shrink by 10% in a main shrinkage direction, subsequently the film being air-dried for 24 hours in an atmosphere of 65% of relative humidity at 23° C.

It is preferable for the film to satisfy the above-described (d) and (e), and then the film thus may exhibit further excellent slipping property, after the film is made wrap a bottle container in a state of a label and shrink in a steam tunnel. Furthermore, in this case, there may preferably be provided an easily-slipping layer including a lubricant component on at least one surface of the film as an outermost layer. When the easily-slipping layer as the outermost layer including the lubricant component is provided at least on one side of the film, the film advantageously has excellent surface slipping property as a label. Inclusion of the lubricant component only in the outermost layer of the film may avoid disadvantages caused when whole of the film includes the lubricant component, for example, deterioration of transparency, coloring, deterioration of strength of the film, and furthermore can reduce a content of the lubricant component, resulting in advantage in costs.

Furthermore, the easily-slipping layer is preferably formed using a coating method in this case. Since the coating method can form easily-slipping layer thinner as compared with by other methods, for example, laminating method by means of co-extrusion etc., and therefore may advantageously exhibit solvent adhesion property described later. In addition, one surface of the film may preferably be adhered with another surface thereof using organic solvents. It is because that possibility of mutual adhesion of the surfaces using the organic solvents will allow easier processing by application of usual methods (a center sealing method) such as a solvent adhesion processing for general heat shrinkable films.

Furthermore, when the film is measured for a dynamic viscoelasticity in a main shrinkage direction under conditions of: expansion and contraction mode of frequency of 50 Hz; temperature range of −20° C. to 250° C.; heating rate of 2° C./minute, a dispersion other than an alpha dispersion is preferably observed in a temperature range where a dispersion other than the alpha dispersion originated in polystyrene is observed. It is because that a heat shrinkable polystyrene film having the dispersion other than the alpha dispersion observed in the temperature range can exhibit excellent heat-resisting property and dimensional stability after shrinkage, when shrink arises with alpha dispersion, that is, a dispersion of relaxation inducing heat shrink phenomenon, and a dispersion by crystallization, generation of gel-form structure, etc. around end of shrinkage arises. The dispersion other than the alpha dispersion is often observed in syndiotactic polystyrenes, copolymers thereof, and also in polystyrene resin compositions including crystalline components.

Effect of the Invention

A heat shrinkable film by the present invention has excellent transparency, and also has improved slipping property on a side as an external surface in use as a label of containers for beverages. Thereby, the heat shrinkable film concerned may prevent jamming of articles in beverage vending machines, and also may exhibit excellent processing suitability fully satisfying solvent adhesion property.

BEST MODE FOR CARRYING-OUT OF THE INVENTION

A heat shrinkable polyester film of the present invention has an easily-slipping layer on a surface of the heat shrinkable polyester film.

A heat shrinkable polyester film of the present invention is obtained using a single copolymerized polyester having ester units formed from publicly known polybasic carboxylic acid components and polyhydric alcohol components as a principal constitution unit, or a mixture of two or more polyesters.

The heat shrinkable polyester film of the present invention has a shrinkage percentage of not less than 50% in a maximum shrinkage direction, when the film is immersed in hot water at 95° C. for 10 seconds. Unsatisfactory heat shrinkage percentage of the film of less than 50% does not allow close contact of the film to containers, and disadvantageously generates defect appearance, when the film is made to wrap the containers and subsequently made to shrink. A more preferable heat shrinkage percentage is not less than 52%, and a still more preferable heat shrinkage percentage is not less than 55%. A term of "hot water shrinkage percentage at 95° C." as used in the present invention is a value calculated by a following equation, where, the heat shrinkable polyester film (when easily-slipping layer etc. is laminated, whole of the laminated film) is cut into a shape of a square measuring 10 cm×10 cm of a sample; the sample obtained is immersed in hot water at 95° C. for 10 seconds and then withdrawn from the hot water. After immersing, the size of the sample is measured, and then a larger value of values in lengthwise direction and horizontal directions is defined as a hot water shrinkage percentage in a maximum shrinkage direction.

Shrinkage percentage (%)=((size before heating−size after heating)/(size before heating))×100

The heat shrinkable polyester film will, hereinafter, be described in detail. As dicarboxylic acid component that constitutes the polyester in a raw material composition used for a heat shrinkable polyester film of the present invention, there may be used terephthalic acid that constitutes an ethylene terephthalate unit, aromatic dicarboxylic acids and alicyclic dicarboxylic acids.

The aromatic dicarboxylic acids include benzenecarboxylic acids, such as isophthalic acid, orthophthalic acid, 5-tert-butyl isophthalic acid, and 5-sodium sulfoisophtharate; naphthalene dicarboxylic acids, such as 2,6-naphthalene dicarboxylic acid; dicarboxy biphenyls, such as 4,4'-dicarboxy diphenyl, 2,2,6,6-tetramethyl biphenyl-4,4'-dicarboxylic acid; 1,1,3-trimethyl-3-phenyl indene-4,5-dicarboxylic acid and derivatives thereof; 1,2-diphenoxyethane-4,4'-dicarboxylic acid and derivatives thereof etc.

Aliphatic carboxylic acids include oxalic acid, malonic acid, succinic acid, glutaric acid, adipic acid, azelaic acid, sebacic acid, pimelic acid, suberic acid, undecanoic acid, dodecanedicarboxylic acid, brassylic acid, tetradecane dicarboxylic acid, thapsic acid, nonadecanedicarboxylic acid, docosanedicarboxylic acid, and derivatives thereof, 4,4'-dicarboxy cyclohexane, and derivatives thereof etc.

Diol components of the polyesters in a raw material composition include any of aliphatic diols, alicyclic diols, and aromatic diols, in addition to ethylene glycol that constitutes the polyethylene terephthalate unit. Aliphatic diols include diethylene glycol, propylene glycol, butanediol, 1,6-hexandiol, 1,10-decanediol, neopentylglycol, 2-methyl-2-ethyl-1, 3-propanediol, 2-diethyl-1,3-propanediol, 2-ethyl-2-n-butyl-1,3-propanediol etc. Alicyclicdiols include 1,3-cyclohexane dimethanol, 1,4-cyclohexane dimethanol etc. Aromaticdiols include ethyleneoxide addition product of bisphenol compounds, such as 2,2-bis(4'-β-hydroxyethoxy phenyl)sulfone; xylylene glycol etc. In addition, polyalkylene glycols, such as polyethylene glycols and polypropylene glycols may also be used as diol components.

Polyesters included in the raw material composition may be obtained from the acid components and diol components. In preparation of the polyesters, one or more kinds of acid components or diol components are preferably used in combination in order to improve properties as heat shrinkable films, and kinds and contents of monomer components to be used in combination are suitably determined based on desired film properties, economical efficiency, etc. The raw material composition includes one or more kinds of polyesters. When one polyester is to be included, the polyester is a copolymerized polyester containing ethylene terephthalate unit. In use of a polyester as a combination of two or more kinds of polyesters, the polyester is a mixture of a copolymerized polyester and a homopolyester having a desired composition. Since copolymerized polyesters have a lower melting point and generally has problems, such as difficulty in handling at the time of drying, they are preferably used in a mixed state of homopolyesters (polyethylene terephthalate, polyethylenenaphthalate, poly (1,4-cyclohexene diethylene terephthalate), etc.) and copolymerizedpolyesters. However, in order to obtain a heat shrinkable polyester film, 1 to 2 mol % of whole of the polyester is preferably aliphatic dicarboxylic acid unit. Control of this composition within the limit allows control of starting temperature of heat shrink in a preferable range.

Each of the polyesters in the raw material composition may be manufactured by conventional methods. The polyester may be prepared using, for example, a direct esterification method carrying out a direct reaction of dicarboxylic acids and diols, an ester interchange method carrying out reaction between dicarboxylic acid dimethyl esters and diols etc. Preparation may be performed by either method of a batch process and a continuous process. The raw material composition may also include various kinds of publicly known additives if needed besides the polyesters. Additives include, for example, lubricants, such as titanium dioxide, particle-like silica, kaolin, and calcium carbonate; antistatic agents; antioxidants; ultraviolet ray absorbents; and colorants (dyestuffs etc.).

The raw material composition is molded into a shape of a film by publicly known methods (for example, an extrusion method, a calendering method). The shape of the film may, for example, be planar, or tubular, and it is not limited in particular. As drawing methods, for example, publicly known methods, such as a roll drawing method, a long gap drawing method, a tenter drawing method, and a tubular drawing method, may be employed. In any case where these methods are used, drawing may be performed using a sequential biaxial drawing, a concurrent biaxial drawing, a uniaxial drawing, and combination of the drawing methods. In the biaxial drawing, drawing in vertical and horizontal directions may be performed simultaneously, or drawing in either of directions may beforehand be performed. The draw ratio is suitably set within a range of 1.0 time to 7.0 times, and a ratio in a predetermined direction is preferably set not less than 3.5 times.

In drawing process, preheating is preferably given to a material film at a temperature of not less than a glass transition temperature (Tg) of the polymer constituting the film, and not more than Tg+80° C. In heat setting at the time of drawing, the film preferably is passed within a heating zone having a temperature of 30° C. to 150° C. for approximately 1 to 30 seconds, for example after drawing. In addition, after drawing of the film, the film may be drawn at a predetermined draw ratio before or after heat setting. Furthermore, after the drawing process, there may be performed an additional process for cooling the film under application of stress to the film while maintaining the film under elongated state or stressed state, or subsequently additional cooling process after canceling of stressed state. The thickness of the film obtained is preferably in a range of 6 to 250 μm.

Composition of polystyrene resins constituting a heat shrinkable polystyrene film concerning the present invention is not especially limited as long as predetermined heat shrink properties are exhibited.

When a heat-shrinkable polystyrene film of the present invention is immersed in hot water at 95° C. for 10 seconds, it gives a shrinkage percentage of not less than 50% in a maximum shrinkage direction. Unsatisfactory heat shrinkage percentage of the film of less than 50% disadvantageously fails to give close contact of the film to containers when the film is made to wrap the containers and subsequently made to shrink, leading to occurrence of defective appearance. The heat shrinkage percentage is more preferably not less than 52%, and still more preferably not less than 55%.

The heat shrinkable polystyrene films will, hereinafter, be described in detail.

A suitable polystyrene resin in the present invention is preferably a resin including polystyrene in a syndiotactic structure. A polystyrene resin having substantially only a syndiotactic structure is more preferably used as the polystyrene. Use of the polystyrene resin having the syndiotactic structure will easily provide a film having excellent mechanical strength and heat resistance. The polystyrene resin has a lower density and it is advantageous in separation for recycling process, and furthermore it has excellent heat resistance, and especially, heat resistance in storage at elevated temperatures. Since it exhibits smaller variation of printing pitch caused by shrinkage with time after film formation, it advantageously improves printing accuracy as a label. Furthermore, it has excellent durability to solvents included in printing inks, resulting in excellent printing property.

The polystyrene resin having the syndiotactic structure preferably has not less than 75% of dyad (constitutional unit is two moieties), and more preferably not less than 85%, and in addition, it preferably has not less than 30% pentad (constitutional unit is five moieties), and more preferably not less than 50%, in tacticity for determining, with nuclear magnetic resonance method, phenyl groups and/or replaced phenyl groups as a side chain.

Polystyrene components constituting polystyrene resins used in the present invention include: polystyrene; poly(alkyl styrenes), such as, poly (p-, m-, or o-methylstyrene), poly (2,4-, 2,5-, 3,4-, or 3,5-dimethylstyrene), poly(p-tertiary-butylstyrene) etc.; poly(halogenated styrenes), such as, poly(p-, m-, or o-chlorostyrene), poly(p-, m-, or o-bromostyrene), poly(p-, m-, or o-fluorostyrene), poly(o-methyl-p-fluorostyrene) etc.; poly(halogenated alkyl styrenes), such as poly(p-, m-, or o-chloromethyl styrenes); poly(alkoxy styrenes), such as poly (p-, m-, or o-methoxystyrenes) and poly(p-, m-, or o-ethoxy styrenes);

poly(carboxy alkyl styrenes), such as poly(p-, m-, or o-carboxymethyl styrene; poly(alkyl ether styrenes), such as poly (p-vinylbenzyl propyl ethers); poly(alkyl silyl styrenes), such as poly(p-trimethylsilyl styrene; and poly(vinylbenzyl dimethoxy phosphides).

In the heat shrinkable polystyrene film by the present invention, as preferable physical property, when the film is measured for a dynamic viscoelasticity in a main shrinkage direction under conditions of: expansion and contraction mode of frequency of 50 Hz; temperature range of −20° C. to 250° C.; heating rate of 2° C./minute, a dispersion other than an alpha dispersion is preferably observed in a temperature range where a dispersion other than the alpha dispersion originated in polystyrene is observed. Incidentally, according to "Abstract for the 44th Rheology Conference of Japan (1996), pp 169-172, by (Nakatani, Yamada et al.)", alpha dispersion, that is, dispersion of relaxation giving heat shrink phenomena, is often observed in syndiotactic polystyrenes, copolymer thereof, and polystyrene resin compositions having crystalline components.

A heat shrinkable polystyrene film of the present invention having such physical properties may be obtained by drawing an undrawn sheet, wherein a dispersion other than an alpha dispersion is observed in a temperature range where a dispersion other than the alpha dispersion originated in polystyrene is observed under conditions of: expansion and contraction mode of frequency of 50 Hz; temperature range of −20° C. to 250° C.; heating rate of 2° C./minute, in measurement of dynamic viscoelasticity of the undrawn sheet before drawing for obtaining the film concerned. Such an undrawn sheet may be obtained by solidifying by rapid cooling with a cooling roller at about 20° C. to 50° C., for example, after melt-extrusion of a raw resin from a T-die at a temperature of about 250° C.

In a heat shrinkable polystyrene film of the present invention, as a polystyrene resin constituting at least one layer of the film, there may be used a polystyrene resin obtained by blending plasticizers, compatibilizers, etc. for lowering of a heat shrink starting temperature and for improvement of impact resistance in polymerization of styrene, they may be used a polystyrene containing plasticizers, compatibilizers, etc.

Furthermore, a heat shrinkable polystyrene film of the present invention may effectively blended with other thermoplastic resins and/or rubber components with respect to the polystyrene resin. Other thermoplastic resins blended here include polystyrene system resins, such as polystyrene resins having an atactic structure, AS resins, ABS resins, etc.; as well as polyester resins, such as polyethyleneterephthalates, polyethylene naphthalates, and polybutyleneterephthalates; polyamide resins, such as nylon 6, nylon 66, nylon 12, nylon 4, and polyhexamethylene adipamide; and polyolefin system resins, such as polyethylenes, polypropylenes, and polybutenes etc.

In addition, the rubber components preferably include rubbery copolymers including styrene compounds as a constitution component, and there may be mentioned random, block, or graft copolymers obtained by copolymerization of components of not less than one kind respectively chosen from a group of styrene and the rubber. Examples of such rubbery copolymers include, for example, styrene-butadiene copolymer rubbers and styrene-isoprene block copolymer rubbers, and furthermore, rubbers obtained by hydrogenation of a part or all of butadiene moieties in these copolymer rubbers, methylacrylate-butadiene-styrene terpolymer rubbers, acrylonitrile-butadiene-styrene terpolymer rubbers, acrylonitrile-alkylacrylate-butadiene-styrene rubbers, methylmethacrylate-alkylacrylate-butadiene-styrene rubbers etc.

Since the rubbery polymers including styrene compounds as the constitution component have a styrene unit in a molecule thereof, they exhibit excellent dispersibility to polystyrene resins mainly having a syndiotactic structure, leading to excellent development of physical properties improvement effect to polystyrene resins. Especially, rubbery copolymers including the styrene compounds as the constitution component is preferable as compatibility regulators.

Rubber components include, in addition to the above-mentioned examples, natural rubbers, polybutadienes, polyisoprenes, polyisobutylenes, neoprenes, ethylene-propylene copolymer rubbers, polyurethane rubbers, silicone rubbers, acrylic rubbers, polyether-ester rubbers, polyester-ester rubbers, etc.

The weight average molecular weight of the polystyrene resins constituting the heat shrinkable polystyrene film of the present invention is preferably not less than 10000, and more preferably not less than 50000. Weight average molecular weights of less than 10000 show tendency of giving insufficient tensile-properties, and heat resistance of the film. Although an upper limit of the weight average molecular weight is not especially limited, weight average molecular weights of not less than 1500000 show tendency of causing breakage due to increase of drawing tensions, and therefore the weight average molecular weights are preferably not more than 1500000.

In order to provide improvement in electrostatic adhesive properties, easily-slipping property, drawability, processing suitability, impact resistance, etc., or to attain surface roughness, opacity, hollow structure, weight saving, etc., resins other than the above described components, plasticizers, compatibility regulators, inorganic particles, organic particles, colorants, antioxidants, antistatic agents, etc. may suitably be blended into the heat shrinkable polystyrene film concerning the present invention, in a range without impairing performance intended by the present invention.

Use of the polystyrene resins as constituent material of a heat shrinkable polystyrene film gives excellent heat shrink properties to the film of the present invention, and also makes the film exhibit excellent adhesive property and printing property with ink in label formation etc., and furthermore it does not make film generate pinholes etc. in printed surfaces. In addition, the film concerned has excellent properties in industrially wasting and gives only little load to environment in incineration treatment.

The polystyrene resins may be formed in the shape of a film by conventional extruding methods, calendering methods, etc. The shape of the film is not limited in particular, and planar shape and tubular shape are common. As drawing methods, a roll drawing method, a long gap drawing method, a tenter drawing method, a tubular drawing method etc., which are generally adopted conventionally, can be used without limitation. In use of any methods of them, a sequential biaxial drawing method, a concurrent biaxial drawing method, a uniaxial drawing method, and a combination thereof may be adopted. In the case of the biaxial drawing method, drawing in vertical and horizontal directions may simultaneously be performed, and a sequential biaxial drawing method that performs either of the directions beforehand is preferable. Either of the vertical and horizontal drawing may be performed beforehand.

Descriptions will, hereinafter, be given for preferable conditions in manufacturing of a heat shrinkable polystyrene film concerning the present invention. A draw ratio is preferably within a range of 1 to 6 times. A draw ratio in one predetermined direction and a draw ratio in a direction perpendicularly intersecting the predetermined direction may be same or may be different from each other. In a drawing process, preheat is preferably performed at a temperature of not less than the glass transition temperature (Tg) of the resin component constituting a film, and of not more than a temperature of (Tg+50° C.). In addition, it is desirable to give an in-line coat before drawing, as mentioned above.

In a heat setting after drawing, the film obtained is preferably passed in a heating zone at 30° C. to 150° C. for about 1 second to 30 seconds. Furthermore, moderate relaxation treatment may be performed after drawing of the film, and before or after heat setting. In addition, after the drawing, a cooling process while in an elongated state or in a tensioned state, that is, in a stress applied condition, may be performed, or furthermore additional cooling process may be added after releasing of stressed state.

A heat shrinkable polyester film having excellent slipping property of the first aspect of the present invention has an easily-slipping layer formed thereon having a solid content coated amount containing a silicone component of 0.002 to 0.5 g/m² on at least one surface of the polyester film, the friction coefficient between the easily-slipping layers satisfies a relationship of $\mu d \leq 0.27$, and preferably $\mu d \leq 0.27$. A heat shrinkable polyester film of the present invention may be obtained by laminating an easily-slipping layer having a solid content coated amount of 0.002 to 0.5 g/m² that contains a silicone component on a surface of the heat shrinkable polyester film. A solid content coated amount represents an amount of a coated material that exists on the polyester film after application and drying. As the easily-slipping layer, an easily-slipping layer containing a silicone component and a binder resin component is preferable. A silicone component represents organosiloxanes, and some of them have properties of oils, rubbers, resins, etc., and they are referred to as silicone oils, silicone rubbers, and silicone resins, respectively. Since the silicones have water-repellency, lubricity, and mold releasing property etc., use of this film as a surface in lamination is effective in lowering of friction of the surface. Furthermore, in many cases, shrinking and wrapping with steam or hot air in use as a beverage container label are performed. An easily-slipping layer having a lower water resistance remarkably loses slipping property in shrinkage treatment, but water-repellent effect of the silicones can maintain slipping property excellent even after treating with steam.

Silicone resins may especially be recommended among them. Silicone resins represent organopolysiloxanes having three-dimensional network structures. The resins do not allow easy transfer to a polyester film back surface contacting thereto, when the film is taken up in a shape of a roll after an easily-slipping layer is laminated on a surface of the polyester film. In addition, when printing processing is given in use as a beverage label, excellent printing property will be exhibited. Furthermore, a silicone resin having a methyl group as an organic group has excellent heat resistance, and also it is especially suitable for use as a label of hot beverage containers.

As the content of the silicone component, an existing amount in the easily-slipping layer is preferably 10 to 80% by weight, and especially preferably 40 to 70%. Only smaller improvement effect of slipping property may be attained with an existing amount of less than 10% by weight, and transfer of the coated layer component easily occurs with an existing amount exceeding 80% by weight.

In addition, the silicones may be used in combination with other lubricants. Lubricants usable together include paraffin waxes, micro waxes, polypropylene waxes, polyethylene waxes, ethylene-acrylic waxes, stearic acid, behenic acid, 12-hydroxystearic acid, octadecanamide, oleamide, erucamide, methylene bisoctadecanamide, ethylene bisoctadecanamide, ethylene bisoleamide, butyl stearate, stearic acid monoglyceride, pentaerythritol tetra stearate, hydrogenated castor oils, stearyl stearate, siloxanes, higher alcohol polymers, stearyl alcohol, calcium stearate, zinc stearate, magnesium stearate, lead stearate, etc. Of these lubricants, improvement in slipping property based on stick preventive effect may be expected by addition of lower molecular weight polyethylene waxes caused by addition of smoothing property to a layer surface.

Inorganic particles, such as silica, titania, mica, talc, calcium carbonate, etc., organic particles, such as polymethyl methacrylate (PMMA), styrene-divinylbenzene resins, formaldehyde resins, silicone resins, polyamidoimides, benzoguanamine resins, etc., or surface treated thereof etc. may be added for further improving slipping properties. Since formation of surface unevenness etc. is likely to reduce transparency of the film, recommended is suitable adjustment of an amount of addition based on necessity of transparency.

Binder resin components include, for example, ester resins, amido resins, urethane resins, epoxy resins, phenol resins, acrylic resins, vinyl acetate resins, olefin resins, such as polyethylenes or polypropylenes, cellulosic resins, melamine resins, or copolymers or modified resins of the above-mentioned resins, as well as resins having curability with heat and light energy etc. Since especially ester resins, urethane resins, or copolymers thereof, exhibit excellent slipping property by combination with lubricants, and furthermore enable adhesion with solvents in tube processing, they are especially recommended. Furthermore, resins in aqueous dispersion type are preferably used from a viewpoint of safety and environmental protection. The binder resin components have effects as a binder, and improve adhesive properties to the polyester film of the easily-slipping layer, and furthermore the components also serve as a drawing assistant for smooth surface in drawing of the film after lamination of the easily-slipping layer. Furthermore, they have an effect also in making surface tougher, when drawn.

In the present invention, the easily-slipping layer preferably includes a polyester resin component having a styrene moiety in a molecule thereof as the binder resin component. A resin components having a styrene moiety include, for example, polystyrene resins, polyester resins, polyamido resins, polyurethane resins, epoxy resins, phenol resins, polyvinyl acetate resins, polyolefin resins, such as polyethylenes or polypropylenes, cellulosic resins, melamine resins, and resins including, in copolymers of these resins or modified resins, styrene moiety introduced by methods, such as copolymerization from monomer, block copolymerization, and graft copolymerization.

In these resin components, polyester resins having styrene moiety may be recommended, because the polyester resins have an effect of raising hardness of the layer, exhibit excellent slipping property by use in combination with silicone components and furthermore have excellent adhesive property with solvents in tubing processing. In addition, polyester resins as used herein represents high molecular compounds obtained by polycondensation of polybasic acids and polyhydric alcohols, and they may be copolymerized resins or modified resins.

Furthermore, the resin components have an effect as a binder, can improve adhesive properties of an easily-slipping layer with a film, and furthermore they also serve as a drawing assistant for giving a smoother surface in drawing of the film after lamination of the easily-slipping layer. Furthermore, as resin components having styrene moiety, resins in aqueous dispersion type are preferably used from a viewpoint of safety and environmental protection.

In addition, drawing of the film after lamination of the easily-slipping layer has an effect of making the surface layer tougher, and a thinner layer may be given. Formation methods of the easily-slipping layer include a method of lamination on a surface using a melting extrusion of an easily-slipping resin, application of an easily-slipping coating liquid in a film production process (in-line coating), application of the easily-slipping coating liquid after film production process (off-line coating) etc. In view of effect of providing better adhesive properties of the film and the coated layer by means of drawing and heat treatment after application, of effect of making the layer tougher, of effect of enabling realization of thinner film and improving transparency, and of costs, preparation by the in-line coating is preferable. A reverse roll method, an air knife method, a fountain method, etc. may be used.

In application processes in the in-line coating, after forming a polyester raw material composition in a shape of a film by a melting extrusion method etc., or after uniaxial drawing of the extruded film, the above-mentioned easily-slipping coating liquid is preferably applied onto a film surface so as to give a smooth and uniform thickness. Additional heating and biaxial or uniaxial drawing process draws the coated layer together with the film, and thereby this process advantageously improves adhesive properties between the film and the coated layer and improvement effect of toughness of the film.

In one embodiment of the present invention, it is especially preferable that an easily-slipping layer is formed on a surface of a heat shrinkable polyester film, using a silicone resin as a lubricant, and an ester resin, an urethane resin, an acrylic resin, or a copolymer of the resins, preferably a polyester resin having a styrene moiety as a binder resin component.

The amount of a coated layer existing on a film after drawing and drying is preferably 0.002 to 0.5 g/m$^2$, and more preferably 0.002 to 0.2 g/m$^2$. An amount not more than 0.002 g/m$^2$ increases frictional resistance. An amount exceeding 0.5 g/m$^2$ causes lowering of transparency of a film, and furthermore generates abrasion wastes in process due to rubbing against each other between rolls etc. and a laminated surface.

Description will, hereinafter, be given for a tubing processing. Tubing processing is performed when manufacturing a label from the heat shrinkable polyester film of the present invention, and in this processing, adhesion is usually performed using solvents in many cases. Therefore, the film may preferably be adhered together, when a solvent, such as 1,3-dioxolane, or tetrahydrofuran, is applied onto one surface of the film, and another surface of the film is bonded with pressure to the applied surface. When the adhesive strength is unsatisfactory, possible separation of label bonded portion may occur, in heat shrinking and wrapping of the label or in beverage bottle handling.

A heat shrinkable polystyrene film of the present invention satisfies that a friction coefficient at least between one and the same surface of the film satisfies a relationship of $\mu d \leq 0.25$. Furthermore, the heat shrinkable polystyrene film of the present invention satisfies that a friction coefficient at least between one and the same surface of the film satisfies a relationship of $\mu d \leq 0.28$, the film being immersed in hot water at 80° C. for 20 seconds, allowing shrink by 10% in a main shrinkage direction, subsequently the film being air-dried for 24 hours in an atmosphere of 65% of relative humidity at 23° C. When the friction coefficients at least between one and the same surface of the film exceeds 0.25 in any surface of the film, slipping property between the label surfaces will be insufficient in wrapping of a container by the film in a label state and subsequent shrinking by a hot air tunnel method, leading to easy occurrence of jamming of the containers in supplying to vending machines, or discharge from the machine. Besides, when the friction coefficient at least between one and the same surface of the film $\mu d$ exceeds 0.28 also in any surface of the film, the film being immersed in hot water at 80° C. for 20 seconds, allowing shrink by 10% in a main shrinkage direction, subsequently the film being air-dried for 24 hours in an atmosphere of 65% of relative humidity at 23° C., slipping property between the label surfaces will also be insufficient in wrapping of a container by the film in a label state and subsequent shrinking by a steam tunnel method, leading to easy occurrence of jamming of the containers in supplying to vending machines, or discharge from the machine.

The heat shrinkable polystyrene film of the present invention preferably gives a friction coefficient between one and the same surface of the film not more than 0.23. Furthermore, a friction coefficient at least between one and the same surface of the film preferably gives not more than 0.23, the film being immersed in hot water at 80 degrees C. for 20 seconds, allowing shrink by 10% in a main shrinkage direction, subsequently the film being air-dried for 24 hours in an atmosphere of 65% of relative humidity at 23° C.

This friction coefficient is secured appropriately by formation of an easily-slipping layer including a lubricant component in an outermost surface of at least one side of a heat shrinkable polystyrene film. Incidentally, arrangement of the easily-slipping layer including lubricant components on an outermost layer side will avoid disadvantages caused by inclusion of the lubricant component in whole of the film, for example, deterioration of transparency, coloring, strength reduction of the film, etc., and also reduce an absolute amount of the lubricant components, resulting in advantage in manufacturing costs. Adoption of a method for forming the easily-slipping layer by a coating method enables formation of a thinner easily-slipping layer as compared with films by other methods, for example, a laminating method by means of co-extrusion etc., leading to advantages also in exhibiting solvent adhesion property described later.

The easily-slipping layer is preferably formed as a thin layer having a thickness of about not more than 0.1 μm (in terms of an amount of coating of about not more than 0.1 g/m$^2$), and more preferably about not more than 50 nm (in terms of an amount of coating of about not more than 0.05 g/m$^2$) on an outermost layer side of the heat shrinkable polystyrene film. Depending on constituent materials of the easily-slipping layer, an excessively thick easily-slipping layer tends to reduce solvent adhesion property. The thickness of the easily-slipping layer of about not less than 0.4 μm (in terms of an amount of coating about not less than 0.4 g/m$^2$) will induce deterioration of the aforementioned solvent adhesion property, and of transparency of the film, and furthermore generate abrasion wastes in process due to rubbing against each other between rolls etc. and laminated surfaces. Conversely, since an excessively thin easily-slipping layer causes shortage of slipping property, the thickness is preferably not less than 5 nm (in terms of an amount of coating about not less than 0.005 g/m$^2$), and more preferably not less than 8 nm (in terms of an amount of coating about not less than 0.008 g/m$^2$).

Although concrete methods of forming the easily-slipping layer in a coating method is not especially limited, preferable is a method in which coating is carried out to a raw film before drawing at the time of the film production, and, subsequently drawing is performed, that is, an in-line coating method. Adoption of this method can form the easily-slipping layer efficiently as a more uniform thin film, leading to advantages in costs.

A heat-shrinkable polystyrene film of the present invention is more preferably solvent-adhesive. Solvent adhesive films allows processing by general methods of solvent adhesion processing for usual heat shrinkable films (for example, center sealing method etc.), that is, more simplified process will be realized as compared with a method needing a certain period of time of aging after lamination by means of application of adhesives.

A preferable embodiment of the present invention is, as described above, a heat shrinkable polystyrene film having an easily-slipping layer coated thereon at least one surface of the film, and having an easily-slipping layer preferably formed by an in-line coating method in film production, the easily-slipping layer preferably including a binder resin component as well as a lubricant component in order to improve solvent adhesion property of the film.

Use of particle-form lubricant components as lubricants may deteriorate transparency of the film, and particles may coagulate, and care is to be paid for use of them. Preferable lubricants suitable for avoiding such a problem include paraffin waxes, micro waxes, polypropylene waxes, polyethylene waxes, ethylene-acrylic waxes, stearic acid, behenic acid, 12-hydroxystearic acid, octadecanamide, oleamide, erucamide, methylene bisoctadecanamide, ethylene bisoctadecanamide, ethylene bisoleamide, butyl stearate, stearic acid monoglyceride, pentaerythritol tetra stearate, hydrogenated castor oils, stearyl stearate, siloxanes, higher alcohol polymers, stearyl alcohol, calcium stearate, zinc stearate, magnesium stearate, lead stearate, low molecular weight silicones (dimethylsiloxane) (oils), silicone (dimethylsiloxane) resins etc. They may independently be used, and two or more of them may be used in combination. Since low molecular weight silicones (oils) and silicone resins may reduce dynamic friction coefficient of a film surface, and hardly decrease solvent adhesion property of the film among them, they are especially preferably used.

Silicone lubricant components are preferably used as in the heat-shrinkable polyester film as the first aspect of the present invention. Especially preferable example includes silicone resins among the above-described silicones. The content of the silicone resins is preferably 10 to 80 mass % as an existing amount in the easily-slipping layer, and more preferably 20 to 70 mass %. An existing amount of less than 10 mass % can only exhibit smaller improvement effect in slipping property, and an existing amount exceeding 80 mass % makes easily a component of the easily-slipping layer transfer to back surface, when the film is wound into a roll.

Binder resin components to be blended in the easily-slipping layer include, for example various resins, such as polyester resins, polyamido resins, polyurethane resins, epoxy resins, phenol resins, acrylic resins, polyvinyl acetate resins, cellulosic resins, styrene resins etc. Since styrene-acrylic copolymer resins exhibit more excellent slipping property in combination with lubricants described above, they are preferably used. Any of the above-mentioned lubricant and binder resin components are preferably used in water soluble, or water dispersive type, from a viewpoint of safety and environmental protection.

EXAMPLES

Although the present invention will, hereinafter, be described in more detail with reference to Examples, the following examples are not intended to limit the present invention, and various modifications and alterations performed without departing from the scope and spirit of the present invention will be included in the present invention. Various measuring methods of physical properties of the film obtained by examples and comparative examples will be given below.

(1) Heat Shrinkage Percentage

A drawn film was cut into a shape of a square measuring 10 cm×10 cm so that one side of the film becomes parallel to a longitudinal direction of the drawn film. The film was immersed in water tank heated at 95° C. for 10 seconds. Immediately after 10 seconds, the film was immersed in a separately prepared water tank at a temperature of 23° C. to 25° C. for 20 seconds, and then a length of a main shrinkage direction of the film was measured to calculate a heat shrinkage percentage. A direction giving a largest shrinkage was defined as a main shrinkage direction.

Heat shrinkage percentage (%)=((size before heating−size after heating)/(size before heating))×100

(2) Friction Coefficient

A dynamic friction coefficient μd between film surfaces and a range of fluctuation R were measured for, according to on JIS K 7125, and under conditions of 23° C. and 65% RH. In addition, a film having experienced 10% of shrinkage in a main shrinkage direction by treating the film in hot water at 80° C. for 20 seconds was measured for a dynamic friction coefficient after hot water treatment by a same method as in the above-described method.

(3) Haze

Haze was measured for according to JIS K 6714 using a haze meter (made by Nihon Seimitsu Company). Evaluations were given according to following criteria.

O: ≦8.0%

X: >8.0%

(4) Solvent Adhesion Strength

A solvent of 1,3-dioxolane was applied to a drawn film, and then two of the films were bonded together to be closely sealed. The sealed portions were cut into pieces with a width of 15 mm, respectively, in a main drawing direction and in an orthogonal direction to main shrinkage direction of the film.

The piece were fixed to a tensile testing machine STM-50 made by Baldwin Co., Ltd., and were measured for a peeling strength by a 90° peel test, at a peeling speed of 200 mm/minute. Evaluations were given according to following criteria.

○: ≧4 N/15 mm

X: <4 N/15 mm (5) Abrasion Resistance

In abrasion resistance evaluation, an abrasion loss was measured for using color fastness rubbing tester (made by Yasuda Seiki Seisakusho, LTD.) A film sample was attached on a specimen stand (surface 200 mm in radius) so as to show a surface giving a smaller friction coefficient of the film, using a friction block (surface radius 45 mm, arc of 50 mm, and width 25 mm) having 2 sheets of absorbent gauze and a sandpaper with a particle diameter of #1000 sequentially attached thereto to show surfaces thereof. The sample was treated on conditions of 400 g of load, 30 round-trips/minute, and 100 mm of round trip distance. A weight change per treated region unit area ($g/m^2$) in 10 round-trip treatments was measured for.

(6) Dynamic Viscoelasticity

Each undrawn sheet obtained in manufacturing process of a heat shrinkable polystyrene film was cut in MD (machine direction) as a longitudinal direction so as to give a width of 5 mm, and a length of a section to be measured of 30 mm to obtain a specimen. Each specimen was measured for dynamic viscoelasticity using a dynamic viscoelasticity measuring device manufactured by IT Keisoku Seigyo Co., Ltd., under conditions of: expansion and contraction mode of frequency of 50 Hz; temperature range of −20° C. to 250° C., heating rate of 2° C./minute. In a temperature range where alpha dispersion origianted from polystyrene is observed, existence of dispersion other than alpha dispersion was identified.

(7) Vending Machine Jamming

A film was formed into a tube shape label so that an easily-slipping layer might be arranged outside, and then a drum section of PET bottle for beverages having a volume of 500 mL was wrapped with the film by heat shrink with steam. A number of cases (pieces) giving jamming in 400-discharge was measured when the bottles were inserted into a vending machine and then discharged.

Experiment 1

(1) Polyester Resin and Undrawn Film

A mixed polyester composition of 40% by weight of polyethylene terephthalate, 50% by weight of a polyester, obtained by 100 mole % terephthalic acid and 30 mole % of neopentyl glycol and 70 mole % of ethylene glycol and 10% by weight of polybutylene terephthalate was melted at 280° C., and extruded from a T-die, and then quenched with a chill roll to obtained an undrawn film.

(2) Preparation of Coating Liquid

Prepared was a coating liquid as an IPA-water solution containing 95% by weight in solid content of a solid component of a aqueous dispersion of a dimethyl silicone resin and a styrene-acrylate copolymer (Creetex KT-290: manufactured by NISSIN KAGAKU KENKYUSHO CO., LTD.), and 5% by weight in solid content of a solid component of a surfactant (MEGAFAC F442: manufactured by Dainippon Ink & Chemicals).

(3) Preparation of Coated Film

The coating liquid prepared in (2) was applied to the undrawn film obtained in (1) using a fountain method. After heating until the film temperature gave 70° C., the film was drawn 4.0 times in a transverse direction with a tenter, and then the film was heat set at 80° C. to obtain a heat shrinkable polyester film having an amount of coating of 0.02 $g/m^2$ and a thickness of 50 μm.

Experiment 2

A heat shrinkable polyester film was obtained in a same manner as in Experiment 1, except that in Experiment 1, used was an IPA-water solution containing 40% by weight in solid content of a solid component of a silicone aqueous dispersion (TSM 6343: manufactured by Toshiba Silicone Co., Ltd.); 15% by weight in solid content of a solid component of a polyethylene wax aqueous dispersion (High-Tech E-8237: manufactured by Toho Chemical Co., Ltd.); 30% by weight in solid content of a solid component of an ester resin aqueous dispersion (VYLONAL MD 1500: manufactured by Toyobo Ltd.); and 15% by weight in solid content of a solid component of a surfactant (MEGAFAC F442: manufactured by Dainippon Ink & Chemicals).

Experiment 3

A heat shrinkable polyester film was obtained in a same manner as in Experiment 1, except that in Experiment 1, used was an IPA-water solution containing 50% by weight in solid content of a solid component of a silicone aqueous dispersion (TSM 6343: manufactured by Toshiba Silicone Co., Ltd.); 15% by weight in solid content of a solid component of a polyethylene wax aqueous dispersion (High-Tech E-8237: manufactured by Toho Chemical Co., Ltd.); 30% by weight in solid content of a solid component of an ester resin aqueous dispersion (VYLONAL MD 1500: manufactured by Toyobo Ltd.); and 5% by weight in solid content of a olid component of a surfactant (MEGAFAC F442: manufactured by Dainippon Ink & Chemicals).

Experiment 4

A heat shrinkable polyester film was obtained in a same manner as in Experiment 1, except that the coating liquid was applied after transverse drawing so as to give an amount of coating 0.7 $g/m^2$ in Experiment 1.

Experiment 5

A heat shrinkable polyester film was obtained in a same manner as in Experiment 2, except that the coating liquid was applied so as to give an amount of coating 0.7 $g/m^2$ in Experiment 2.

Experiment 6

A heat shrinkable polyester film was obtained in a same manner as in Experiment 1, except that used was, as a coating liquid, an IPA-water solution containing 30% by weight in solid content of a solid component of a polyethylene wax aqueous dispersion (High-Tech E-8237: manufactured by Toho Chemical Co., Ltd.); 50% by weight in solid content of a solid component of an ester resin aqueous dispersion (VYLONAL MD 1500: manufactured by Toyobo Ltd.); and 20% by weight in solid content of a solid component of a surfactant (TB 214: manufactured by Matsumoto Yushi-Seiyaku Co., Ltd) in Experiment 1, and the coating liquid was applied so as to give an amount of coating of 0.01 g/m².

Experiment 7

A heat shrinkable polyester film was obtained in a same manner as in Experiment 1, except that in Experiment 1, used was, as a coating liquid, an IPA-water solution containing 70% by weight in total solid in a coating liquid of a solid component of a dimethyl silicone resin (S4005: manufactured by Nissin Chemicals); 20% by weight in solid content of a solid component of a styrene copolymerized polyester resin aqueous dispersion (AGN 709: manufactured by Toyobo Ltd.); and 10% by weight in solid content of a solid component of a surfactant (MEGAFAC F442: manufactured by Dainippon Ink & Chemicals), and the coating liquid was applied so as to give an amount of coating of 0.02 g/m².

Experiment 8

A heat shrinkable polyester film was obtained in a same manner as in Experiment 1, except that in Experiment 1, used was, as a coating liquid, an IPA-water solution containing 60% by weight in solid content of a solid component of a silicone aqueous dispersion (TSM 6343: manufactured by Toshiba Silicone Co., Ltd.); 35% by weight in solid content of a solid component of a styrene copolymerized polyester resin aqueous dispersion (AGN 709: manufactured by Toyobo Ltd.); and 5% by weight in solid content of a solid component of a surfactant (TB 214: manufactured by Matsumoto Yushi-Seiyaku Co., Ltd), and the coating liquid was applied so as to give an amount of coating of 0.02 g/m².

Experiment 9

A heat shrinkable polyester film was obtained in a same manner as in Experiment 1, except that in Experiment 1, used was, as a coating liquid, an IPA-water solution containing 50% by weight in total solid in a coating liquid of a solid component of a dimethyl silicone resin (S4005: manufactured by Nissin Chemicals); a styrene copolymerized polyester resin aqueous dispersion (AGN 707: manufactured by Toyobo Ltd.); 40% by weight in solid content of a solid component of a polyethylene wax aqueous dispersion; and 10% by weight in solid content of a solid component of a surfactant (MEGAFAC F442: manufactured by Dainippon Ink & Chemicals), and the coating liquid was applied so as to give an amount of coating of 0.02 g/m².

Experiment 10

A heat shrinkable polyester film was obtained in a same manner as in Experiment 1, except that in Experiment 1, used was an IPA-water solution containing 95% by weight in total solid in a coating liquid of a solid component of a dimethyl silicone resin (S4005: manufactured by Nissin Chemicals); and 5% by weight in solid content of a solid component of a surfactant (MEGAFAC F442: manufactured by Dainippon Ink & Chemicals), and the coating liquid was applied so as to give an amount of coating of 0.02 g/m².

Experiment 11

A heat shrinkable polyester film was obtained in a same manner as in Experiment 1, except that in Experiment 1, used was, as a coating liquid, a aqueous dispersion (HYDRAN HW 340: manufactured by Dainippon Ink & Chemicals) of a polyurethane resin was used instead of the styrene copolymerized polyester resin aqueous dispersion, and the coating liquid was applied so as to give an amount of coating of 0.02 g/m².

Experiment 12

A heat shrinkable polyester film was obtained in a same manner as in Experiment 1, except that in Experiment 1, used was, as a coating liquid; 5% by weight in total solid in a coating liquid of a solid component of a dimethyl silicone resin (S4005: manufactured by Nissin Chemicals); 85% by weight in solid content of a solid component of a styrene copolymerized polyester resin aqueous dispersion (AGN 709: manufactured by Toyobo Ltd.); and 10% by weight in solid content of a solid component of a surfactant (MEGAFAC F442: manufactured by Dainippon Ink & Chemicals), and an amount of coating was set as 0.02 g/m².

Experiment 13

A heat shrinkable polyester film was obtained in a same manner as in Experiment 7, except that in Experiment 7, the coating liquid was applied to the film after drawing, and an amount of coating was set as 0.02 g/m².

Table 1 shows raw material compositions of easily-slipping layers of the films, and Table 2 and 3 shows obtained film properties.

TABLE 1

| Experiment No. | Lubricant Kind | Weight % | Binder resin Kind | Weight % | Surfactant Kind | Weight % | Coated amount g/m² | Coating method |
|---|---|---|---|---|---|---|---|---|
| 1 | Creetex KT-290 | 95 | — | — | MEGAFAC F442 | 5 | 0.02 | In-line |
| 2 | TSM6343 E-8327 | 40 15 | MD1500 | 15 | MEGAFAC F442 | 15 | 0.02 | In-line |
| 3 | TSM6343 E-8327 | 50 15 | MD1500 | 30 | TB214 | 5 | 0.02 | In-line |
| 4 | Creetex KT-290 | 95 | — | — | MEGAFAC F442 | 5 | 0.7 | Off-line |
| 5 | TSM6343 E-8327 | 40 15 | MD1500 | 30 | MEGAFAC F442 | 15 | 0.001 | In-line |
|   | E-8327 | 30 | MD1500 | 50 | TB214 | 20 | 0.01 | In-line |
| 7 | S4005 | 70 | AGN709 | 20 | MEGAFAC F442 | 10 | 0.02 | In-line |
| 8 | TSM6343 | 60 | AGN709 | 35 | TB214 | 5 | 0.02 | In-line |
| 9 | S4005 | 50 | AGN709 | 40 | MEGAFAC F442 | 10 | 0.02 | In-line |
| 10 | S4005 | 95 | — | — | MEGAFAC F442 | 5 | 0.02 | In-line |
| 11 | TSM6343 | 60 | HW340 | 35 | TB214 | 5 | 0.02 | In-line |

TABLE 1-continued

| Experiment | Lubricant | | Binder resin | | Surfactant | | Coated amount | Coating |
|---|---|---|---|---|---|---|---|---|
| No. | Kind | Weight % | Kind | Weight % | Kind | Weight % | g/m² | method |
| 12 | S4005 | 5 | AGN709 | 85 | MEGAFAC F442 | 10 | 0.02 | In-line |
| 13 | S4005 | 70 | AGN709 | 20 | MEGAFAC F442 | 10 | 0.7 | Off-line |

TABLE 2

| Experiment No. | Friction coefficient Untreated (μd) | After heat treatment (μd) | Abrasion resistance (amount of abrasion loss) (g/m²) | Solvent adhesion property | Hot water shrinkage percentage (%) | Transparency (haze) | Vending machine jamming (piece/ 400 pieces) |
|---|---|---|---|---|---|---|---|
| 1 | 0.15 | 0.18 | 0.10 | ○ | 61 | ○ | 0 |
| 2 | 0.15 | 0.16 | 0.08 | ○ | 60 | ○ | 0 |
| 3 | 0.18 | 0.20 | 0.08 | ○ | 61 | ○ | 0 |
| 4 | 0.13 | 0.13 | 0.42 | X | 62 | X | — |
| 5 | 0.34 | 0.41 | 0.10 | ○ | 60 | ○ | 4 |
| 6 | 0.19 | 0.34 | 0.11 | ○ | 60 | ○ | 3 |

TABLE 3

| Experiment No. | Friction coefficient μd | R | Abrasion resistance (amount of abrasion loss) (g/m²) | Solvent adhesion property Main shrinkage direction | Orthogonal to main shrinkage direction | Hot water shrinkage percentage (%) | Transparency (haze) | Vending machine jamming (piece/ 400 pieces) |
|---|---|---|---|---|---|---|---|---|
| 7 | 0.15 | 0.01 | 0.12 | 48 | 48 | 61 | ○ | 0 |
| 8 | 0.17 | 0.03 | 0.10 | 44 | 39 | 60 | ○ | 0 |
| 9 | 0.20 | 0.01 | 0.12 | 48 | 42 | 61 | ○ | 0 |
| 10 | 0.13 | 0.01 | 0.09 | 44 | 28 | 62 | ○ | 0 |
| 11 | 0.18 | 0.03 | 0.11 | 39 | 26 | 60 | ○ | 0 |
| 12 | 0.35 | 0.14 | 0.14 | 47 | 38 | 61 | ○ | 4 |
| 13 | 0.13 | 0.02 | 0.41 | 29 | 22 | 63 | X | — |

A printing machine was operated with a line speed of 100/minute using two of 500 m film rolls of each level obtained in Experiments 1 to 3, Experiment 4, Experiments 7 to 9, and Experiment 13, and Experiments 1 to 3 and Experiments 7 to 9 did not give abrasion waste on all the guide rolls. In Experiment 4 and Experiment 13, deposition of powdered white abrasion waste was visually recognized especially on a metal guide roll (surface anodized aluminum processing, diameter of 74 mm) of a portion near beginning to winding in rolls contacted to the easily-slipping layer coated side.

Experiment 14

(1) Polystyrene Resin and Undrawn Film

A raw material chip of a main resin obtained by blending 0.05% by weight of calcium carbonate particle with a mean particle diameter of 1.0 μm as a lubricant into a syndiotactic polystyrene (weight average molecular weight 300,000) obtained by copolymerizing 40 mole % of 4-methyl styrene as a constituent component; a raw material chip of a styrene-butadiene block copolymer (rubber component) obtained by copolymerizing 40% by weight of styrene as a constituent component; and a raw material chip of a high styrene rubber as a compatibility regulator (styrene-butadiene copolymer rubber; styrene as a constituent component 85 mass % included) were fed with a metering screw feeder so as to give a proportion of 65/30/5 (main resin/rubber component/regulator) by amass ratio, and then delivered material was blended within a hopper with a angle of inclination of 70° right above an extruder. The material was melted at 250° C., and was extruded from a T-die having a 800 μm lip gap, and then extruded material was forced onto a 40° C. cooling roller by an air knife method for quenching and solidification, obtaining an undrawn sheet.

(2) Preparation of Coating Liquid

Used was as a coating liquid an IPA-water solution containing: 90 mass parts, in terms of solid content, of an aqueous dispersion of a dimethyl silicone resin and a styrene-acrylate copolymer (Creetex KT-290: manufactured by Nissin Chemicals); and 10 mass parts, in terms of solid content, a solid component of a surfactant (MEGAFAC F442: manufactured by Dainippon Ink & Chemicals).

(3) Preparation of Coated Film

The coating liquid prepared in (1) was applied to an undrawn film obtained in (2) by a fountain method, and the applied film was heated until film temperature was 90° C. The film was then drawn 5.0 times in a transverse direction with a tenter, and subsequently was heat set at 60° C. to obtain a heat shrinkable polystyrene film having an amount of coating of 0.015 g/m², and a thickness of 60 μm.

Experiment 15

A heat shrinkable polystyrene film was obtained in a same manner as in Experiment 14, except that used was an IPA-water solution containing: 40% by mass in solid content of a solid component of a silicone aqueous dispersion (TSM 6343: manufactured by Toshiba Silicone Co., Ltd.); 10% by mass in solid content of a solid component of a polyethylene wax aqueous dispersion (High-Tech E-8237: manufactured by Toho Chemical Co., Ltd.); 30% by mass in solid content of a solid component of an ester resin aqueous dispersion (VYLONAL MD 1500: manufactured by Toyobo Ltd.), and 20% by mass in solid content of a solid component of a surface active agent (MEGAFAC F442: manufactured by Dainippon Ink & Chemicals).

Experiment 16

A heat shrinkable polystyrene film was obtained in a same manner as in Experiment 14, except that used was an IPA-water solution containing: 45% by mass in solid content of a solid component of a silicone aqueous dispersion (TSM 6343: manufactured by Toshiba Silicone Co., Ltd.); 15% by mass in solid content of a solid component of a polyethylene wax aqueous dispersion (High-Tech E-8237: manufactured by Toho Chemical Co., Ltd.); 35% by weight in solid content of a solid component of an ester resin water dispersion (VYLONAL MD 1500: manufactured by Toyobo Ltd.), and 5% by mass in solid content of a solid component of a surface active agent (MEGAFAC F442: manufactured by Dainippon Ink & Chemicals).

Experiment 17

A heat shrinkable polystyrene film was obtained in a same manner as in Experiment 14 except that an amount of coating was set as 0.7 g/m² in Experiment 14.

Experiment 18

A heat shrinkable polystyrene film was obtained in a same manner as in Experiment 14 except that an amount of coating was set as 0.001 g/m² in Experiment 14.

Experiment 19

A heat shrinkable polystyrene film was obtained in a same manner as in Experiment 14 except that used was an IPA-water solution containing: 10% by mass in solid content of a solid component of a silicone aqueous dispersion (TSM 6343: manufactured by Toshiba Silicone Co., Ltd.); 15% by mass in solid content of a solid component of a polyethylene wax aqueous dispersion (High-Tech E-8237: manufactured by Toho Chemical Co., Ltd.); 60% by mass in solid content of a solid component of an ester resin aqueous dispersion (VYLONAL MD 1500: manufactured by Toyobo Ltd.); and 15% by mass in solid content of a solid component of a surface active agent (MEGAFAC F442: manufactured by Dainippon Ink & Chemicals) in Experiment 14.

Experiment 20

A heat shrinkable polystyrene film was obtained in a same manner as in Experiment 19, except that a raw material chip of a main resin obtained by blending 0.05% by weight of calcium carbonate particle with a mean particle diameter of 1.0 μm as a lubricant into an atactic polystyrene (weight average molecular weight 300,000) obtained by copolymerizing 40 mole % of 4-methyl styrene as a constituent component; a raw material chip of a styrene-butadiene block copolymer (rubber component) obtained by copolymerizing 10% by weight of styrene as a constituent component; and a raw material chip of a high styrene rubber as a compatibility regulator (styrene-butadiene copolymer rubber; styrene as a constituent component 85 mass % included) were blended so as to give a proportion of 40/55/5 (main resin/rubber component/regulator) by a mass ratio.

Table 4 shows raw material compositions of easily-slipping layers of films, and Table 5 shows obtained film properties.

TABLE 4

| Experiment No. | Lubricant Kind | Mass parts | Binder resin Kind | Mass parts | Surface active agent Kind | Mass parts | Coated amount g/m² | Coating method |
|---|---|---|---|---|---|---|---|---|
| 14 | Creetex KT-290 | 90 | — | — | MEGAFAC F442 | 10 | 0.015 | In-line |
| 15 | TSM6343 | 40 | MD1500 | 30 | MEGAFAC F442 | 20 | 0.015 | In-line |
| 16 | TSM6343 E-8327 | 45 15 | MD1500 | 35 | TB214 | 5 | 0.015 | In-line |
| 17 | Creetex KT-290 | 90 | — | — | MEGAFAC F442 | 10 | 0.7 | In-line |
| 18 | TSM6343 | 40 | MD1500 | 30 | MEGAFAC F442 | 20 | 0.001 | In-line |
| 19 | TSM6343 E-8327 | 10 15 | MD1500 | 60 | TB214 | 5 | 0.015 | In-line |
| 20 | TSM6343 E-8327 | 10 15 | MD1500 | 60 | TB214 | 5 | 0.015 | In-line |

TABLE 5

| Experiment No. | Friction coefficient Untreated (μd) | Friction coefficient After heat treatment (μd) | Abrasion resistance (amount of abrasion loss) (g/m²) | Dynamic viscoelasticity (existence of dispersion other than alpha dispersion) | Solvent adhesion property | Hot water shrinkage percentage (%) | Transparency (haze) | Vending machine jaming (piece/400 pieces) |
|---|---|---|---|---|---|---|---|---|
| 14 | 0.16 | 0.17 | 0.10 | Observed | ○ | 68 | ○ | 0 |
| 15 | 0.15 | 0.16 | 0.08 | Observed | ○ | 67 | ○ | 0 |
| 16 | 0.18 | 0.21 | 0.08 | Observed | ○ | 68 | ○ | 0 |
| 17 | 0.13 | 0.13 | 0.44 | Observed | X | 66 | X | — |
| 18 | 0.34 | 0.41 | 0.10 | Observed | ○ | 67 | ○ | 4 |
| 19 | 0.30 | 0.32 | 0.10 | Observed | ○ | 69 | ○ | 3 |
| 20 | 0.31 | 0.34 | 0.11 | Not observed | X | 58 | ○ | 4 |

A printing machine was operated with a line speed of 100/minute using two of 500 m film rolls of each level obtained in Experiments 14 to 17, and Experiments 14 to 16 did not give abrasion waste on all the guide rolls. In Experiment 17, deposition of powdered white abrasion waste was visually recognized especially on a metal guide roll (surface anodized aluminum processing, diameter of 74 mm) of a portion near beginning to winding in rolls contacted to the easily-slipping layer coated side.

The invention claimed is:

1. A heat shrinkable polyester film satisfying items (A) to (C):
   (A) an easily-slipping layer having an amount of coating in terms of solid content of 0.002 to 0.5 g/m² is formed on at least one surface of the polyester film, wherein the solid content contains a silicone component;
   (B) a friction coefficient between two portions of a surface of the easily-slipping layer satisfies a relationship of μd≦0.27; and
   (C) the heat shrinkable polyester film exhibits a heat shrinkage percentage of not less than 50% in a maximum shrinkage direction, after immersion in hot water at 95° C. for 10 seconds; and
   wherein the easily-slipping layer includes a polyester resin component having a styrene moiety in a molecule thereof.

2. The heat shrinkable polyester film according to claim 1, wherein the friction coefficient satisfies a relationship of μd≦0.24.

3. The heat shrinkable polyester film according to claim 2, wherein a percentage of the silicone component in a solid content of the easily-slipping layer is 10 to 80% by weight, and a silicone component content is 0.001 to 0.4 g/m².

4. The heat shrinkable polyester film according to claim 1, wherein the silicone component in the solid content of the easily-slipping layer is 10 to 80% by weight, and the silicone component content is 0.001 to 0.4 g/m².

5. The heat shrinkable polyester film according to claim 1, wherein a portion of one surface of the film is adhered to a portion of the other surface of the film with an organic solvent.

* * * * *

UNITED STATES PATENT AND TRADEMARK OFFICE
CERTIFICATE OF CORRECTION

PATENT NO. : 7,638,203 B2
APPLICATION NO. : 10/581902
DATED : December 29, 2009
INVENTOR(S) : Inagaki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 478 days.

Signed and Sealed this

Ninth Day of November, 2010

David J. Kappos
*Director of the United States Patent and Trademark Office*